United States Patent Office 2,916,511
Patented Dec. 8, 1959

2,916,511

β,β'-DICYANOVINYL THIOETHER

Everett J. Frazza, Yorktown Heights, N.Y., and Lorence Rapoport, Stamford, Conn., assignors to American Cyanamid Company, New York, N.Y., a corporation of Maine No Drawing. Application December 24, 1957
Serial No. 704,884

1 Claim. (Cl. 260—465.8)

This invention relates to β,β'-dicyanovinyl thioether and the preparation thereof.

β,β'-Dicyanovinyl thioether is prepared according to the process of this invention by reacting β-chloroacrylonitrile with a sulfide. More particularly, the product of this invention is obtained by reacting β-chloroacrylonitrile with $H_2S$ or an alkali metal sulfide or hydrosulfide in an inert reaction medium. On completion of the reaction, which is conducted at below about 100° F., the precipitate is separated by conventional means and the β,β'-dicyanovinyl thioether recovered from the residual liquor as by distillation or crystallization.

The particular reaction medium employed in the process of this invention is restricted only in that it be inert to the reactants and is preferably a solvent therefor. Any of the conventional materials, including water, which are generally employed in this capacity are suitable. Alcohols such as methanol; chlorinated aliphatic hydrocarbons such as carbon tetrachloride and trichlorethylene; benzene and its homologues and their halogenated derivatives; amides such as dimethylformamide; esters such as ethyl acetate; ethers and the like may all be used. When employing $H_2S$, a hydrogen chloride acceptor should be present in the reaction medium. Various materials may be employed for this purpose illustrative of which are inorganic bases such as sodium hydroxide, sodium carbonate and bicarbonate; tertiary amines such as triethylamine, N-ethylmorpholine, dimethylbenzylamine, tributylamine, pyridine, N-methylpyridine and the like.

The compound of this invention has various uses. Among these may be mentioned its use in the field of agriculture wherein herbicidal properties have been demonstrated. Radish seeds, representing dioctyledonous plants, when treated with an aqueous dispersion of β,β'-dicyanovinyl thioether show a high mortality at a concentration of 0.01%. The unsaturation of this compound, moreover, renders it useful in the preparation of a variety of copolymers for use in recognized fields.

The following example further illustrates the invention. All parts are by weight unless otherwise indicated.

EXAMPLE 1

β,β'-Dicyanovinyl thioether

NCCH=CHSCH=CHCN

A suspension of 48.0 parts of $Na_2S \cdot 9H_2O$ in 280 parts of ethanol is prepared by heating until solution is complete and then cooling to 25° with good stirring. To the suspension is added 35.0 parts of β-chloroacrylonitrile over a period of 20 minutes with cooling to maintain the temperature at 25–29° C. After standing overnight, the reaction mixture is filtered, concentrated by evaporation and diluted by the addition of 900 parts of water. The precipitate is separated by filtration to give 15 g. (55%) of β,β'-dicyanovinyl thioether which, after recrystallization from ethyl acetate-cyclohexane, melted at 142.4–143.2° C. Calculated for $C_6H_4N_2S$: C, 52.92%; H, 2.96%; N, 20.58%. Found: C, 52.73%; H, 2.95%; N, 20.54%.

We claim:
β,β'-Dicyanovinyl thioether.

References Cited in the file of this patent
UNITED STATES PATENTS 2,163,176   Keyssner _____ June 20, 1939

OTHER REFERENCES

Nekrassow: J. Prak. Chime, 117 (1927), pp. 211–212.